Nov. 15, 1960 C. D. P. SMALLPEICE 2,960,303
FLUID CONTROL VALVE
Filed Jan. 24, 1956

United States Patent Office 2,960,303
Patented Nov. 15, 1960

2,960,303

FLUID CONTROL VALVE

Cosby D. P. Smallpeice, "Flagstaff," Swanwick Shore, near Southampton, England

Filed Jan. 24, 1956, Ser. No. 561,048

Claims priority, application Great Britain Apr. 22, 1955

4 Claims. (Cl. 251—11)

This invention relates to a fluid control valve, particularly, but not exclusively, for controlling flow of compressed air.

It has previously been proposed to operate fluid control valves by electrical means, such, for example, as electromagnets, and electrical motors of various kinds.

An object of the invention is to provide a fluid control valve in which electrical energy is used to heat an element the consequent expansion of which controls operation of the valve.

A more specific object of the invention is to provide a fluid control valve which includes a heat-expansible element adapted to be heated directly or indirectly by electrical resistance heating, thermal expansion of the element consequent upon said heating being used to control operation of the valve from one condition to another.

Figure 1:
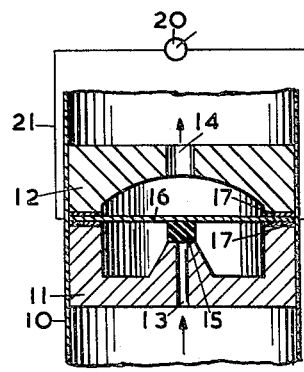
Figure 1 is a sectional elevation of a fluid control valve according to the invention, an electric control circuit being shown diagrammatically.

In Figure 1 the valve is shown embodied in a conduit 10 through which fluid, for example, compressed air, is to flow.

In the conduit 10 is fixed a two-part casing 11, 12, the part 11 having an inlet 13 and the part 12 having an outlet 14, the direction of flow being indicated by the arrows.

The inlet 13 is, in the position shown, closed at its upper end by a resilient valve element 15 which is held in place by the expansible metallic element 16. The element 16 is, in this instance, arranged to provide the electrical resistance for the electrical resistance heating, in other words, the expansible metallic element itself carries the current which provides the resistance heating.

One end of the expansible metallic element 16 is connected by a wire 18 to a battery 19 which is in turn connected through a switch 20 and by a wire 21 to the other end of the element 16.

The electrical circuit is purely diagrammatic and can obviously be replaced by any equivalent circuit. In the position shown it is assumed that no current is flowing through the element 16 which therefore holds the valve element 15 firmly in position to close the inlet 13.

By changing the position of the switch 20 current is caused to flow from the battery 19 through the element 16 and the electrical resistance heating produced in the element 16 causes the element to expand and consequently to release the valve element 15 and allow compressed air to flow from the inlet 13 to the outlet 14.

If the current is switched off the element 16 contracts and forces the valve element 15 back on to its seating thereby closing the valve.

The valve shown in Figure 1 can be used directly to control flow of fluid or it can be used to control a flow of compressed air which in turn operates the main valve of the system to control the flow of some other fluid such as oil.

Figure 2:
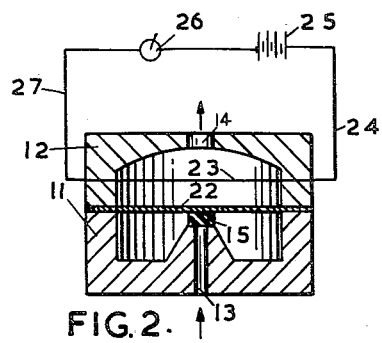
Figure 2 is a sectional elevation of a modification of the valve shown in Figure 1.

The valve shown in Figure 2 can replace the valve shown in Figure 1, being similar except that the expansible metallic element 22 is simply anchored at both ends and is not connected in the electrical circuit.

A separate electrical resistance heater is provided, which may be in the form of a heater wire 23, the heater wire 23 being connected by a wire 24 to a battery 25 and the circuit is completed through a switch 26 and wire 27.

The operation is the same as described with reference to Figure 1 except that the current flowing through the heater wire 23 provides the electrical resistance heating by which the expansible element 22 is indirectly heated.

Figure 3:
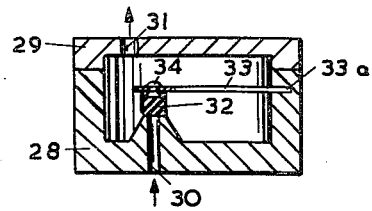
Figure 3 is a sectional elevation of a further embodiment of the invention.

In the valve shown in Figure 3, a similar two-part valve casing 28, 29 has an inlet 30 and an outlet 31. The expansible metallic element is, in this instance, in the form of a bi-metallic strip 33 to which is rivetted, at 34, a valve element 32. The strip 33 is held at one end 33a in the wall of the lower part 28 of the valve casing. As seen from Figure 3a, the bi-metallic strip 33 has two arms 35, 36 and arm 35 is connected by a wire 37 to a battery 38, the circuit being completed to the other arm 36 through a switch 39 and wire 40.

The operation is similar to that described with reference to Figures 1 and 2, the current flowing through the bi-metallic strip causing electrical resistance heating which in turn causes the strip to bend and open the valve.

Figure 4:
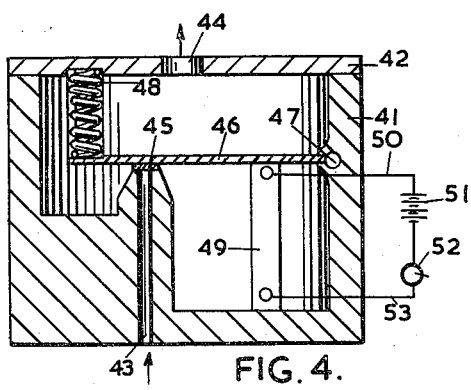
Figures 4 and 5 are sectional elevations of further embodiments of the invention.

The valve shown in Figure 4 consists of a two-part casing 41, 42, having an inlet 43 and outlet 44. The inlet 43, in the position shown, is closed by a resilient valve member 45 carried by an arm 46 pivoted at 47. The arm 46 is biassed to close the valve by means of a spring 48.

The expansible metallic element 49 is also used to provide resistance heating by being connected in a circuit consisting of a wire 50, battery 51, switch 52 and wire 53. When the switch is positioned to allow current to flow from the battery 51 through the expansible metallic element 49 the heating effect of the current causes the metallic element to expand and the longitudinal expansion of the element causes the arm 46 to turn about its pivot 47 so as to open the valve.

When the current is switched off the element 49 contracts and the spring 48 turns the arm 46 about its pivot 47 to close the valve.

Figure 5:
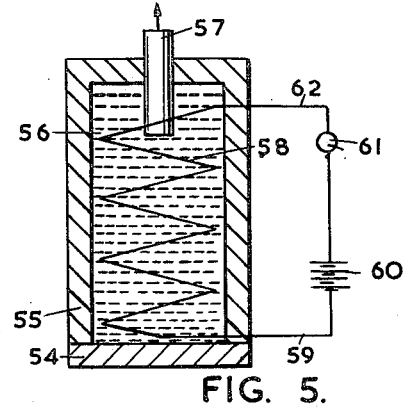

In Figure 5 a two-part casing 54, 55 contains a fluid, which may be liquid mercury, 56. At one end of part 55 of the casing is a plunger 57 which depends into the fluid. In this instance the fluid is the expansible element and the electrical resistance heating is provided by a heater wire 58 connected through a wire 59 to a battery 60 and the circuit is completed by a switch 61 and a wire 62.

With the switch in its "on" position current flows from the battery 60 through the heater wire 58 so as to heat the fluid 56 which expands causing the plunger 57 to rise.

Obviously the plunger 57 can be made to operate any simple form of fluid control valve such as the valve shown in Figure 4.

It will be seen that the movement of the plunger 57 varies according to the expansion of the fluid which in turn varies according to the amount of electrical energy supplied through the heater wire 58. This embodiment of the invention can be used to control a movable valve element so as to vary the opening and closing movement of the valve in proportion to the amount of electrical energy supplied through the wire 58.

Thus it is seen that the heating of the expansible metallic element can be direct or indirect, and either the linear or the volumetric expansion of the element can be used to operate the valve.

Figure 3A:
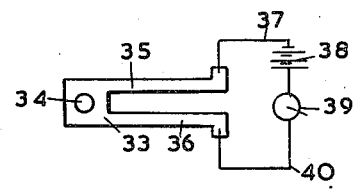
Figure 3a is a plan view of an element of Figure 3, an electrical circuit being shown diagrammatically.

The bi-metallic strip 33 shown in Figure 3a could, in an alternative embodiment of the invention, be used in place of the metallic element 22 so that the bi-metallic strip is indirectly heated.

Obviously the metallic element could also be replaced by a non-metallic heat-expansible element.

What I claim as my invention and desire to secure by Letters Patent of the United States is:

1. A fluid control valve comprising a casing, fluid inlet means to said casing and fluid outlet means from said casing, a valve member movable between an open position in which fluid flow between said inlet and outlet means is permitted and a closed position in which said fluid flow is interrupted, a metallic strip supported by said casing and completely immersed in the fluid in the casing, with at least a part of said strip positioned directly between said inlet and outlet means, said strip also engaging said valve member to bias said valve member to the closed position, and an electrical circuit of which said strip forms a part, whereby said strip is capable of being heated by electrical resistance heating, expansion of said strip on heating permitting said valve member to open, the heat due to current passing through said strip providing the sole heating means for said expansion.

2. A fluid control valve comprising a casing, fluid inlet means to said casing and fluid outlet means from said casing, a valve member movable between open position in which fluid flow between said inlet and outlet means is permitted and a closed position in which said fluid flow is interrupted, a metallic strip supported at each end thereof by said casing and completely immersed in the fluid in the casing, with an intermediate part of said strip positioned directly between said inlet and outlet means, said strip also engaging said valve member to bias said valve member to the closed position, and an electrical circuit of which said strip forms a part, whereby said strip is capable of being heated by electrical resistance heating, expansion of said strip on heating permitting said valve member to open, the heat due to current passing through said strip providing the sole heating means for said expansion.

3. A fluid control valve comprising a casing, fluid inlet means to said casing and fluid outlet means from said casing, a valve member movable between an open position in which fluid flow between said inlet and outlet means is permitted and a closed position in which said fluid flow is interrupted, a metallic strip supported at one end thereof in cantilever manner by said casing and completely immersed in the fluid in the casing, with the free end of said strip positioned directly between said inlet and outlet means, said free end carrying said valve member and normally holding said valve member in a closed position, and an electrical circuit of which said strip forms a part, whereby said strip is capable of being heated by electrical resistance heating expansion of said strip on heating permitting said valve member to open, the heat due to current passing through said strip providing the sole heating means for said expansion.

4. A fluid control valve as claimed in claim 3 in which said metallic strip is a bi-metallic strip.

References Cited in the file of this patent

UNITED STATES PATENTS

| | | |
|---|---|---|
| 389,151 | Hogan | Sept. 4, 1888 |
| 1,897,497 | Pirani | Feb. 14, 1933 |
| 2,077,735 | Beckler | Apr. 20, 1937 |
| 2,232,934 | Baak | Feb. 25, 1941 |
| 2,396,541 | Taylor | Mar. 12, 1946 |
| 2,526,069 | Douglas | Oct. 17, 1950 |
| 2,742,927 | Frumet | Apr. 24, 1956 |
| 2,769,312 | Harrold | Nov. 6, 1956 |
| 2,777,662 | Hansen | Jan. 15, 1957 |